UNITED STATES PATENT OFFICE 2,360,853

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application October 26, 1942, Serial No. 463,436

5 Claims. (Cl. 252—338)

This invention relates to the treatment of petroleum emulsions, and has for its main object to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned is of significant value in removing impurities, particularly inorganic salts from pipeline oil.

Briefly described, our process consists in subjecting a petroleum emulsion of the water-in-oil type, to the action of a demulsifying agent comprising the 2-amino-2-methylpentanol-4 salt of alkylated naphthalene sulfonic acids in which there is at least one alkyl group substituted in the naphthalene nucleus, the said alkyl group or groups, in turn, being characterized by containing at least three carbon atoms and not more than 10 carbon atoms. Said alkylated sulfonic acid can be described by the following formula $D(SO_3H)_n$, in which $n$ indicates any small whole numbers, such as 1, 2, or 3; but generally speaking, the monosulfonic acid would be employed, and for purposes of brevity, the formula $D.SO_3H$ will be used.

If sulfonic acid of the kind typified by the formula $D.SO_3H$ is neutralized with an amine, such salt may be indicated by the formula:

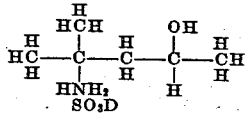

in which $DSO_3$ has its previous significance.

We have discovered that when alkylaryl sulfonic acids of the kind herein described in detail, are neutralized with 2-amino-2-methylpentanol-4, one obtains a demulsifier of unusual effectiveness, and in fact, one which is more effective, in most instances, than the alkylaryl sulfonic acid from which it was obtained, or from the corresponding sodium, potassium, or ammonium salt. As far as we are aware, the particular amine employed for neutralization is without value in regard to demulsifying action, when employed by itself. The effectiveness appears to reside in some unexplainable action or structure which apparently depends on some co-operative reaction between the amine residue and the sulfonic acid residue.

2-amino-2-methylpentanol-4 may be manufactured in various ways. One of the most suitable methods is to convert acetone or some other equivalent reactant into mesityl oxide. Mesityl oxide can then be reacted with ammonia to give diacetonamine. Diacetonamine can be hydrogenated readily to yield 2-amino-2-methylpentanol-4. See "Richter's Organic Chemistry," (Allott), Aliphatic Series, 1934 edition, page 274. See also Beilstein, volume 4, edition 4, page 296 (System #354).

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily, perhaps, as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the particular salts used to produce the demulsifier employed in our process consists in converting the naphthalene into either the alpha or beta naphthalene sulfonic acid, or a mixture of the same, or in some instances, into a di- or even a tri-sulfonic acid, or a tetra-sulfonic acid, or a mixture of the various types. In most instances there is no advantage in introducing more than one sulfonic acid residue. In many instances, it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as a propyl alcohol, a butyl alcohol, an amyl alcohol, a hexyl alcohol, a decyl alcohol, etc., is converted into the acid sulfate, such as propyl hydrogen sulfate.

The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc., are carried out simultaneously. Generally speaking, the di-alkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described, into the aromatic nucleus, one could also introduce an alkyl residue from some other alcohol, as, for example, an alkylated group derived from ethyl or methyl alcohol, or one might introduce a group derived from an aryl, aralkyl, cyclic, or hydroaromatic alcohol, or the like, but regardless of whether or not one introduces such other residues, it is necessary that at least one alkyl residue of the kind described, i. e., having at least three carbon atoms and not more than ten carbon atoms, be introduced into the naphthalene ring. Such compounds having some other group present, such as a methyl group, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lower in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed as the demulsifier in the present process. For instance, although the sulfonic group may be introduced into either the alpha or beta position, it is manifest that the alkyl group or groups can be introduced into various positions in regard to the position of the sulfonic acid residue. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and mixed amyl alcohols, it is our preference to produce our reagents from these alcohols, and in some instances, it is desirable to introduce different alkyl groups, such as a propyl group and butyl group, into the same sulfonaphthalene residue.

In the actual manufacture of alkylated naphthalene sulfonic acids, the composition of the desired chemical reaction is followed by a washing process which removes the excess of sulfuric acid or other sulfonation, sulfation, or condensation reagent employed. The acidic mass thus obtained is neutralized in any convenient manner with any suitable base, such as caustic soda, caustic potash, ammonium hydroxide, and the like. However, in accordance with what has been said herein, the acidic mass is neutralized with 2-amino-2-methylpentanol-4. The final product, if it represents a pasty or semi-solid or solid mass, is rendered suitable for industrial use by the addition of a solvent, such as water, an alcohol, a coal tar solvent, a petroleum hydrocarbon solvent, or the use of any other suitable solvent, such as a phenolic body, or a chlorinated hydrocarbon.

In manufacturing or producing the demulsifier above described, we prefer to obtain a chemical compound by reaction so conducted that three molecules of isopropyl alcohol are united with one molecule of naphthalene by the customary sulfation, sulfonation, and condensation reactions. The resulting mixture consists largely of di-isopropyl naphthalene sulfonic acids and tri-isopropyl naphthalene sulfonic acids, with possibly small amounts of mono-isopropyl sulfonic acids and tetra-propyl sulfonic acids present. Generally speaking, it is easier to conduct the reaction so that the bulk of the sulfonic acid represents the beta type, although the alpha type may be produced, if desired. The product is neutralized with a ketone amine of the kind typified by examples of the kind previously described. The product so obtained is diluted with one or more solvents, so as to reduce its viscosity to that of ordinary castor oil, or slightly greater. The solvents which we preferably employ are a mixture of two or more of the following: Water, denatured alcohol, kerosene, or tar acid oil.

Among the reagents which are particularly effective are the salts formed by reaction between the amine of the kind previously described, and the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl di-normal butyl naphthalene sulfonic acids, di-isopropyl di-normal butyl naphthalene sulfonic acids, di-isopropyl mono-amyl naphthalene sulfonic acids, mono-isopropyl mono-hexyl naphthalene sulfonic acids, etc.

In such instances where there is present more than one sulfonic acid radical, as in the formation of a disulfonic acid, or a tri-sulfonic acid, or a tetrasulfonic acid, if desired, all the sulfonic radicals may be neutralized with 2-amino-2-methyl-pentanol-4, or some of the sulfonic acid radicals may be neutralized with some other suitable base, such as sodium hydroxide, potassium hydroxide, ammonium hydroxide, etc., provided that at least one sulfonic acid radical has been neutralized by the aforementioned amine.

Conventional demulsifying agents employed in the treatment of oil field emulsions are used as such, or after dilution with any suitable solvent, such as water, petroleum hydrocarbons, such as gasoline, kerosene, stove oil, coal tar products, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents, such as demulsifying agents of the modified fatty acid type, complex amine type, the petroleum sulfonate type, the alkylated sulfoaromatic type, neutralized in the conventional manner, or even unneutralized.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

It is to be noted that the increased effectiveness which the amine of the kind described permits or creates in the sulfonic acid, does not appear in other comparable neutralizations of acidic demulsifuing agents. Large varieties of materials which are acidic in nature have been suggested for demulsification, either in the acidic state, or after neutralization. The neutralization of many such materials, for instance, various sulfo derivatives obtained from some other hydrocarbon sources, such as certain non-aryl or aliphatic raw materials, yields rather inferior demulsifying agents when neutralized with 2-amino-2-methylpentanol-4. This is particularly true when such sulfo derivatives derived from non-aryl sources, for example, are compared with analogous sodium, potassium, and ammonium salts. Furthermore, the neutralization of alkylaryl sulfonic acids of the kind described herein with many amines results in a compound having a considerably decreased effectiveness, when used as a demulsifier. For instance, aniline, toluidine, dipropylamine, diamylamine, triamylamine, monoethanolamine, diethanolamine, triethanolamine, tri-isopropanolamine, etc., cannot be substituted for the amine employed for neutralization in the preceding examples, without detracting markedly from the value of the compounds obtained. In other words, if the same alkylated naphthalene sulfonic acids which are employed to produce the chemical compound previously described happened to be neutralized with at least certain other amines, such as those referred to, one apparently does not obtain a reagent of any marked value, and especially a reagent of any superiority or effectiveness for demulsifying oil field emulsions. Similarly, the applicants have experimented with a number of other sulfonic acids, such as certain ones derived from petroleum, as, for example, the mahogany type sulfonic acid, and found that neutralization with the amine of the kind herein described does not give nearly as effective a reagent, in many instances, as conventional neutralization with caustic soda, caustic potash, ammonium hydroxide, and the like. Based on the results of actual tests obtained in a variety of emulsified crudes occurring in a number of the major oil fields of the United States, the conclusion one must inevitably reach is, that the product obtained by uniting the two different residues, i. e., the amine residue of the kind described and the sulfoaromatic residue of the kind described, into a single molecule, has an unlooked-for, unique quality, which could not be foreseen by the present knowledge of the art and which produces a demulsifying agent that is particularly effective for a large number of emulsified crude oils.

In practising our process in regard to oil field emulsions, a suitable quantity of said material is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification. The materials or compounds herein described form the subject-matter of our divisional application Serial No. 500,718, filed August 30, 1943.

Having thus described our invention, what we claim as new and desire to secure by Letters Patent is:

1. A process for breaking petroleum emulsions of the water-in-oil type, characterized by subjecting the emulsion to the action of a demulsifying agent comprising the 2-amino-2-methylpentanol-4 salt of an alkylated naphthalene sulfonic acid in which at least one alkyl group substituted in the naphthalene nucleus contains at least 3 carbon atoms and not over 10 carbon atoms.

2. A process for breaking petroleum emulsions of the water-in-oil type, characterized by subjecting the emulsion to the action of a demulsifying agent comprising the 2-amino-2-methylpentanol-4 salt of an alkylated naphthalene monosulfonic acid in which at least one alkyl group substituted in the naphthalene nucleus contains at least 3 carbon atoms and not over 10 carbon atoms.

3. A process for breaking petroleum emulsions of the water-in-oil type, characterized by subjecting the emulsion to the action of a demulsifying agent comprising the 2-amino-2-methylpentanol-4 salt of an alkylated naphthalene monosulfonic acid in which at least one alkyl group substituted in the naphthalene nucleus contains at least 3 carbon atoms and not over 10 carbon atoms; said sulfonic acid having at least one propyl group directly linked to a nuclear carbon atom.

4. A process for breaking petroleum emulsions of the water-in-oil type, characterized by subjecting the emulsion to the action of a demulsifying agent comprising the 2-amino-2-methylpentanol-4 salt of an alkylated naphthalene monosulfonic acid in which at least one alkyl group substituted in the naphthalene nucleus contains at least 3 carbon atoms and not over 10 carbon atoms; said sulfonic acid having at least one butyl group directly linked to a nuclear carbon atom.

5. A process for breaking petroleum emulsions of the water-in-oil type, characterized by subjecting the emulsion to the action of a demulsifying agent comprising the 2-amino-2-methylpentanol-4 salt of an alkylated naphthalene monosulfonic acid in which at least one alkyl group substituted in the naphthalene nucleus contains at least 3 carbon atoms and not over 10 carbon atoms; said sulfonic acid having at least one amyl group directly linked to a nuclear carbon atom.

MELVIN DE GROOTE.
BERNHARD KEISER.